(12) United States Patent
Winer et al.

(10) Patent No.: US 8,589,104 B2
(45) Date of Patent: Nov. 19, 2013

(54) DEVICE AND METHOD FOR COMPENSATING COLOR SHIFTS IN FIBER-OPTIC IMAGING SYSTEMS

(75) Inventors: Christian Winer, Uttenreuth (DE); Thorsten Zerfass, Bad Sobernheim (DE)

(73) Assignees: Fraunhofer-Gesellschaft zur Foerderung der Angewandten Forschung E.V., Munich (DE); Friedrich-Alexander Universitaet Erlangen-Nuernberg, Erlangen (DE)

( * ) Notice: Subject to any disclaimer, the term of this patent is extended or adjusted under 35 U.S.C. 154(b) by 601 days.

(21) Appl. No.: 12/663,494

(22) PCT Filed: Apr. 21, 2008

(86) PCT No.: PCT/EP2008/003189
§ 371 (c)(1),
(2), (4) Date: Jul. 14, 2010

(87) PCT Pub. No.: WO2008/148444
PCT Pub. Date: Dec. 11, 2008

(65) Prior Publication Data
US 2010/0280781 A1    Nov. 4, 2010

(30) Foreign Application Priority Data
Jun. 8, 2007  (DE) .......................... 10 2007 026 595

(51) Int. Cl.
*G01R 23/16*    (2006.01)

(52) U.S. Cl.
USPC ............... 702/76; 702/57; 702/104; 702/106; 702/189; 702/194; 356/73.1; 356/402; 356/425; 382/162; 382/167

(58) Field of Classification Search
USPC .......... 702/40, 49, 57, 75, 76, 104, 106, 134, 702/159, 172, 189, 194; 356/73.1, 402, 356/425; 382/162, 167
See application file for complete search history.

(56) References Cited

U.S. PATENT DOCUMENTS

| | | | | |
|---|---|---|---|---|
| 4,278,349 A | * | 7/1981 | Sander | 356/44 |
| 5,233,416 A | * | 8/1993 | Inoue | 348/70 |
| 5,264,924 A | * | 11/1993 | Cok | 348/624 |
| 5,515,470 A | | 5/1996 | Eikelmann | |

(Continued)

FOREIGN PATENT DOCUMENTS

| | | |
|---|---|---|
| DE | 4318140 | 12/1994 |
| JP | 01223932 A | 9/1989 |

(Continued)

*Primary Examiner* — Alexander H Taningco
*Assistant Examiner* — Paul D Lee
(74) *Attorney, Agent, or Firm* — Michael A. Glenn; Perkins Coie LLP

(57) ABSTRACT

A color value for an optical fiber of a fiberscope can be generated on the basis of the intensity values of a plurality of sensor elements of a sensor element arrangement that are sensitive to one spectral region each from a set of sensor spectral regions, if calibration values are provided for each of the spectral regions associated with the optical fiber. The intensity values of all sensor elements of the respective spectral region that are illuminated by the light guide can be combined with the provided calibration values, in order to obtain the color value associated with the optical fiber, which reproduces the color of the light transported by the optical fiber.

17 Claims, 3 Drawing Sheets

(56) References Cited

U.S. PATENT DOCUMENTS 5,878,159 A     3/1999  Taleblou
6,016,161 A *   1/2000  Robinson ............... 348/187
6,190,308 B1    2/2001  Irion
6,885,801 B1    4/2005  Shankar

FOREIGN PATENT DOCUMENTS

JP     06331907 A     12/1994
JP     08191439 A     7/1996
JP     08191440 A     7/1996

* cited by examiner

DEVICE AND METHOD FOR COMPENSATING COLOR SHIFTS IN FIBER-OPTIC IMAGING SYSTEMS

BACKGROUND OF THE INVENTION

The present invention concerns a device and a method for compensating for color shifts, as arise when employing fiberscopes with color picture cameras.

Optical systems in which an image is transferred to an imaging sensor by optics are in widespread use. Without the employment of endoscopes for imaging, many applications in the field of diagnostics, inspection, quality assurance and research, among others, would be impossible today. On the one hand, refractive optical systems are used here, i.e. systems with a rigid construction within which the image is transmitted onto the sensor through a lens arrangement, similar to an objective of a camera. On the other hand, fiber-optic systems are employed, which consist of a great number of ordered light-guiding fibers combined in a bundle, wherein the light is guided onto a sensor by the multiplicity of fibers.

The present preference for refractive optical systems is founded in their image quality, among other things. Where, in the literal sense, much more "flexible" employment is demanded (small, difficult access), high-quality semi-rigid or pliable endoscopes (fiberscopes) with small working diameters and glass fiber image guides have to be used. When employing such a fiber-optic system of several image guides, typically a single image point or a single intensity value is transmitted for every single image guide used. In the case of justifiable diameters of the entire fiber bundle, no arbitrarily large amount of individual fibers can be used. The reduced resolution caused thereby, or the honeycomb structure recorded by the sensor due to the arrangement of the light fiber, partially inhibit the use of such devices.

For example, the image guides of high-quality fiberscopes consist of a regularly ordered bundle of about 3,000-20,000 individual fibers. By contrast, a typical (low-resolution) conventional motion-picture camera has 640×480, i.e. more than 300,000 image points (VGA), for example, and the image signal transported by means of the fibers usually is observed with such a motion-picture camera.

The individual light guides mostly comprise a cladding, so that spurious structures in the observed image result from the cladding, which structures may be smoothed by low pass filters or adaptively reduced by spectral masking, for example. So as to remove the structures introduced by the honeycomb structure and highly disturbing for assessing an image, there already exist solutions that interpolate, on the basis of at first localized fiber centers, a honeycomb-free image on the basis of the brightness information at the fiber centers. Just like the smoothing of the honeycombed cladding structures or by way of its masking in the Fourier space, however, these methods, although increasing the quality of representation of the captured image, have the disadvantage of failing to achieve an actual increase in resolution of the image.

One problem that is to be solved, in general, is dealt with in German Patent DE 4318140A1. It describes how the centers of the light spots imaged on a higher-resolution sensor by the individual glass fibers can be determined by fitting a suitable function to the brightness distribution generated by an individual optical fiber on the two-dimensional sensor. The patent shows how an association of the allocation of the fibers on the input side of the optical fiber bundle with the position of the light spots caused by the fibers on the sensor is possible on the basis of the adapted fiber coordinates.

For the representation and computerized further processing of the images captured by means of fiberscopic endoscopes, if possible, structure-free representation is desired. Due to the great industrial importance of fiberscopes for the inspection of cavities of technical components as well as for medial diagnostics and therapy of inner organs, or the use as a positioning aid in automation, high-quality true-color representation of the image produced by means of the endoscope is increasingly being demanded.

The previously used algorithms and methods utilize gray scale images or the individual color channels of a multi-channel color image for image rendition, i.e. they only use monochromatic intensity values of an image.

Color cameras, i.e. sensors with several intensity channels (sensor elements that are sensitive to different spectral regions each), cannot be used with the known methods in their present form. In an alternative approach, followed up to now, for using color captures, filtering and/or interpolation is performed for rendering fiber-optic captures of a color camera on the individual color channels of an image (the basic colors red, green and blue, for example). The separately produced images of the individual color channels are then combined so as to attain a multi-channel color image. Regarding color fidelity of the produced images, however, this procedure does not lead to optimum results. If an image that is produced in such a way, for example, is to be used for further visual use, assessment of image data or extraction and processing of color features, this is achieved only to an unsatisfactory extent, owing to the color shifts resulting from a simple combination of a fiberscope with a color camera.

This approach fails because of the false colors caused by the pattern of the sensor elements with different spectral sensitivity and the non-uniform illumination of the sensor elements by an individual optical fiber. For example, arrangement of the pixels sensitive in the red, green and blue spectral regions is customary in the so-called Bayer pattern in CCD sensors and CMOS sensors. This pattern is characterized in that, in a two-dimensional matrix of sensor elements, sensor elements of identical spectral sensitivity do not border on each other in a horizontal or a vertical direction. Pixels sensitive to red, green and blue light are used here, with the number of pixels sensitive to green light being predominant and exactly twice as high as the number of red-sensitive and/or blue-sensitive pixels. As will be explained in greater detail further below, non-uniform illumination of such a color pattern, and image processing electronics of the color camera optimized for uniform illumination, leads to the sensor and/or the color camera producing false-color image information for the sensor elements illuminated by a single optical fiber.

The problem is further aggravated in the digitization of the image by a fiber bundle, because the imaging faces a trade-off. If an individual fiber were to terminate directly and exclusively on an individual sensor element, the intensity could exactly be determined electronically. However, determination of a color value would only be possible for one color component for the corresponding fiber. This means, although it would physically be known which color component it is, no statement can be made concerning the color composition. In order to determine a color value, it thus is desirable to map each fiber onto several sensor elements (to 3×3 or 5×5 sensor elements, for example). However, an undesired color shift results from the imbalance of stimulated sensor elements following the conversion of raw intensity data of the Bayer pattern to color values.

This is due to the fact that the individual pixels of the camera are not illuminated with identical intensity due to the irregular geometry of the optical fibers within the fiberscope.

For example, while four red-sensitive pixels are illuminated by a fiber, it is possible that the neighboring fiber only illuminates three red-sensitive pixels. Assuming uniform illumination (as underlying the algorithm operating in a color camera), if a color value and/or several color values are computed from the pixels thus illuminated, this inevitably leads to an undesired color shift. This color shift is perceived as extremely disturbing by the observer and also leads to further undesired effects through abrupt color changes (features in the image).

For example, if motion compensation and/or motion estimation is to be performed due to such a false-color image, this is hardly possible, because the motion estimation is particularly based on finding identical intensity patterns in different image regions of various consecutive captures. If the individual captures per se have false colors, i.e. have corrupted intensities, the motion compensation algorithm cannot achieve any reliable result either.

SUMMARY

According to an embodiment, a device for generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, may have: a provider for providing a calibration value associated with the optical fiber for each of the sensor spectral regions; and a corrector for processing the intensity values of all sensor elements illuminated by the optical fiber wherein the corrector is formed to weight a sum of the intensity values of the sensor elements of the respective sensor spectral region with the calibration values associated with the respective sensor spectral regions, in order to acquire the color value associated with the optical fiber.

According to another embodiment, a calibration device for determining a calibration value associated with an optical fiber of a fiberscope for each spectral region of a set of sensor spectral regions of a sensor element arrangement of sensor elements sensitive to one sensor spectral region each for an optical fiber mapped to several sensor elements of the sensor element arrangement, may have: a detector to detect intensity values for all sensor elements illuminated with light of known spectral composition by the optical fiber; and an evaluator for determining the calibration values associated with the respective sensor spectral regions, so that a color value, which is formed from a sum of the intensity values of the sensor elements of the respective sensor spectral region weighted with the respective calibration values, describes the spectral composition of the light.

According to another embodiment, a method of generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, may have the steps of: providing a calibration value associated with the optical fiber for each of the sensor spectral regions; and weighting a sum of the intensity values of the sensor elements of the respective sensor spectral region with the calibration values associated with the respective sensor spectral regions, in order to acquire the color value associated with the optical fiber.

According to another embodiment, a method of determining a calibration value associated with an optical fiber of a fiberscope for each spectral region of a set of sensor spectral regions of a sensor element arrangement of sensor elements sensitive to one sensor spectral region each for an optical fiber mapped to several sensor elements of the sensor element arrangement, may have the steps of: detecting intensity values for all sensor elements illuminated with light of known spectral composition by the optical fiber; and determining the calibration values associated with the respective sensor spectral regions, so that a color value, which is formed from a sum of the intensity values of the sensor elements of the respective sensor spectral region weighted with the respective calibration values, describes the spectral composition of the light.

According to another embodiment, a computer program may have a program code for performing, when the program is executed on a computer, a method of generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, wherein the method may have the steps of: providing a calibration value associated with the optical fiber for each of the sensor spectral regions; and weighting a sum of the intensity values of the sensor elements of the respective sensor spectral region with the calibration values associated with the respective sensor spectral regions, in order to acquire the color value associated with the optical fiber.

According to another embodiment, a computer program may have a program code for performing, when the program is executed on a computer, a method of determining a calibration value associated with an optical fiber of a fiberscope for each spectral region of a set of sensor spectral regions of a sensor element arrangement of sensor elements sensitive to one sensor spectral region each for an optical fiber mapped to several sensor elements of the sensor element arrangement, wherein the method may have the steps of: detecting intensity values for all sensor elements illuminated with light of known spectral composition by the optical fiber; and determining the calibration values associated with the respective sensor spectral regions, so that a color value, which is formed from a sum of the intensity values of the sensor elements of the respective sensor spectral region weighted with the respective calibration values, describes the spectral composition of the light.

Some embodiments of the present invention here are based on the finding that a color value for an optical fiber of a fiberscope can be generated on the basis of the intensity values of a plurality of sensor elements of a sensor element arrangement, each sensitive to one spectral region from a set of sensor spectral regions, if calibration values for each of the spectral regions associated with the optical fiber are provided. The intensity values of all sensor elements of the respective spectral regions that are illuminated by the light guide can be combined with the provided calibration values, in order to obtain the color values associated with the optical fiber, which correctly reproduces the color of the light transported by the optical fiber.

A color value as defined by the present description here is any quantity allowing for determining a position in an arbitrary color space in a unique manner. For example, this may be a triplet of numbers in the case of the RGB and YUV color space. Of course, representations using more than three basic colors and/or more than three quantities are also possible to characterize the color.

Furthermore, the concept is not limited to using colors in the visible spectral range. For example, the method may also be used to determine color values free of corruptions in the infrared spectral region or in the ultraviolet spectral region.

When using sensors for non-visible spectral regions, visualization can be effected byway of false-color representation, or simple mapping of the non-visible spectral region to the visible spectral region can be used for visualizing, and for example using for medical diagnostics, the intensity values acquired in the non-visible spectral region. Thereby, even when using non-visible electromagnetic waves, the image quality is increased significantly, because smaller details, which could otherwise be masked by the color noise, are recognizable in the capture, or become recognizable when using the inventive concept.

Independently of the spectral region used, it is also advantageous for motion recognition, which may be performed on the basis of the ascertained intensity values, if the corruption of color values can be prevented. Here, the motion recognition may also be based on intensity or color values acquired in the non-visible spectral range.

According to an embodiment of the invention, an arrangement consisting of an optical fiber and a color camera attached at the ocular of the optical fiber is calibrated prior to the beginning of the actual measurement, for which purpose the fiber bundle is illuminated homogeneously with white light of a known spectral composition. When the spectral composition of the light used for calibration is known, color calibration of the sensor elements and/or pixels associated with the respective optical fiber can be performed, since the color value to be reproduced by the pixels is known exactly. For example, if white light is being used, it can be assumed, in a simple method with sensor elements sensitive to red, green and blue, that each of the color channels that can be detected by the individual sensor elements shall contribute to the overall intensity with equal strength. A color value for white light is then represented by a triplet of intensity values, with each intensity value having the same value. When using white light and an RGB sensor, it thus is possible to use a mathematically simple algorithm for calibration, since it can be assumed that, after the calibration, each color channel is to contribute to the read-out result at equal intensity, so that correction factors for each color channel can be determined by way of simple computation, which factors lead to every color channel containing one third of the overall detected intensity of an optical fiber after correction when using white light.

In a further embodiment, light that does not have a white appearance is used for calibration. The only important thing is that the spectral composition of the light used is known, in order to calibrate the sensor elements associated with an optical fiber, or determine a calibration factor associated with each one of the spectral regions from the set of sensor spectral regions of the optical fiber concerned. Using light that is not white may here have the advantage that one may use light having about the color composition typically observed with the fiberscope during measurement. For example, if endoscopic examinations are performed on skin-color tissue portions, it may be advantageous to use light having a reddish to pink appearance for calibration, since the calibration values will then be determined with light of a spectral composition that is actually observed during the measurements. This leads to better results in the reconstruction, and the color fidelity of the captures in the measurement operation may even be improved further, for example.

In a further embodiment of the present invention, the calibration is not performed by summation of the intensity values of the pixels associated with the respective spectral regions. Rather, a histogram-based approach is taken, i.e. a function (a Gaussian function, for example) reflecting the intensity distribution caused by an optical fiber on the surface of a color sensor is fitted to the frequency of the occurring intensity values of a spectral region. If the statistic allows for the fitting of such an intensity function for each color, i.e. sufficient sensor elements are illuminated by a single optical fiber, this method allows for exact determination of the calibration values, for example by way of comparison of the found parameters of the function to be fitted.

In a further embodiment of the present invention, a profile weighting factor that takes into account that the intensity distribution produced by means of an optical fiber on the surface of a sensor and/or a sensor arrangement decreases toward the edges independently of the color is provided additionally for each sensor element illuminated by an optical fiber. The profile weighting factor may then be used, in addition to the calibration factor, which is specific to the spectral region, in order to also take the intensity distribution of the light transported by means of an optical fiber, which is caused by the geometry of the optical fiber, into account in the determination of the color value associated with the optical fiber.

In a further embodiment of the present invention, calibration values for each spectral region of the sensor spectral regions of a sensor element arrangement that are supported by a sensor are generated for each optical fiber of a fiberscope by a calibration device. To this end, the optical fiber is illuminated with light of known spectral composition, and calibration values are determined for the respective spectral regions by evaluating means, so that a color value, which may be formed by the intensity values of the illuminated sensor elements calibrated with the calibration values, represents the spectral composition of the light.

BRIEF DESCRIPTION OF THE DRAWINGS

Embodiments of the present invention will be detailed subsequently referring to the appended drawings, in which:

FIG. 1a,b illustratively show an optical fiber illuminating a sensor element arrangement with white light, wherein FIG. 1a illustrates in greyscale the light distribution and FIG. 1b the structure of the sensor element arrangement into red, green and blue pixels;

DETAILED DESCRIPTION OF THE INVENTION

Figure 1A:
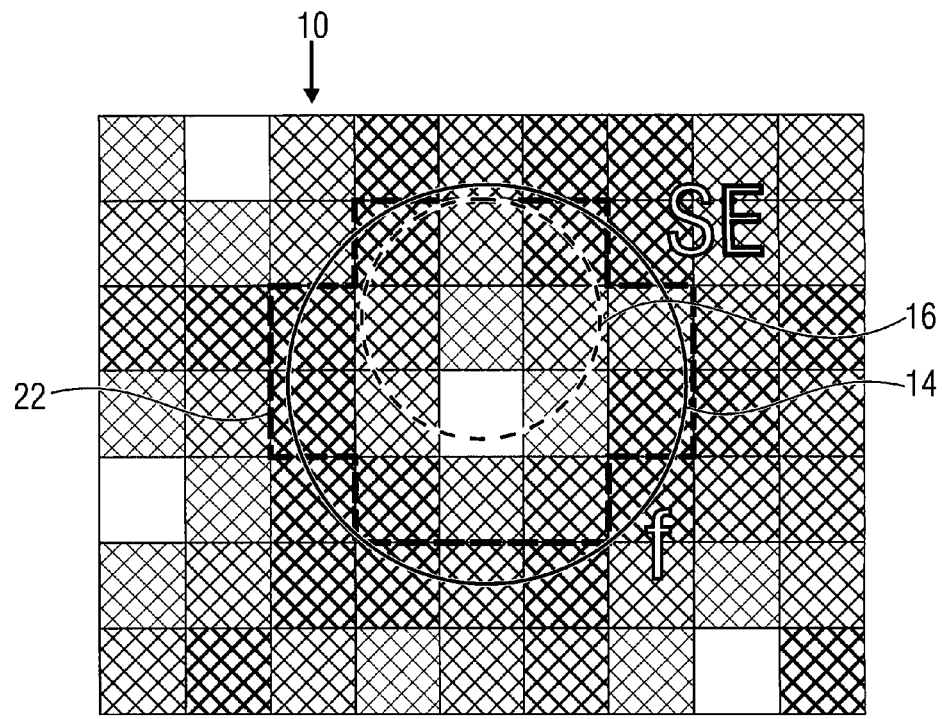
Figure 1B:
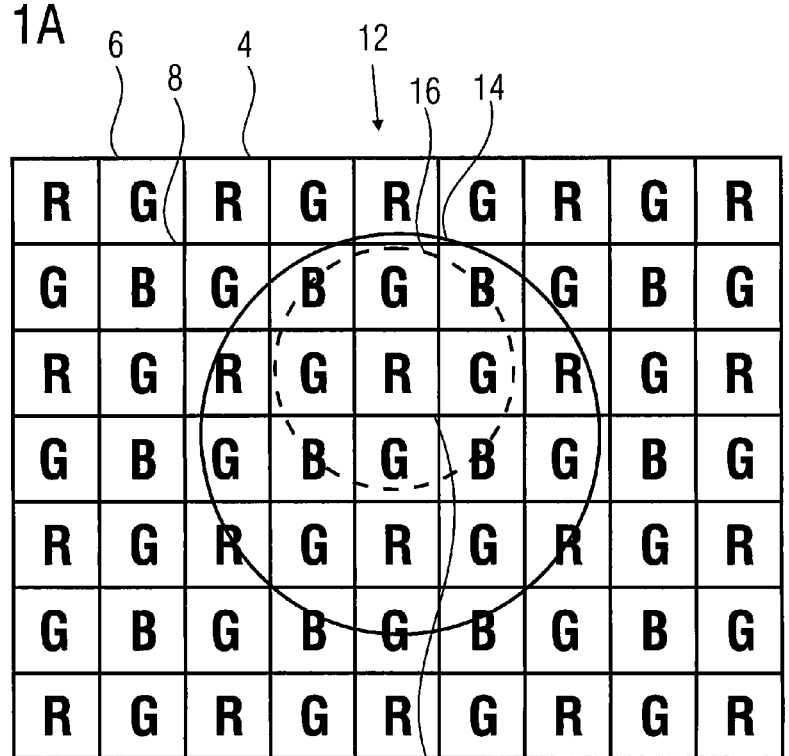

By way of example, FIG. 1a,b shows the image of an optical fiber on the surface of a sensor element arrangement consisting of sensor elements of different spectral sensitivities. By way of example, without limitation of general meaning, there is illustrated a sensor with sensor elements arranged in matrix shape, which are sensitive to red (sensor element 4 marked R, for example), green (sensor element 6 marked G, for example) and blue (sensor element 8 marked B, for example). In the arrangement shown in FIG. 1b, the red, green and blue-sensitive pixels and/or sensor elements are arranged in the so-called Bayer pattern. This arrangement is to be construed as merely exemplary. Further embodiments of the invention may be based on any sensor arrangement, for example on matrix-shaped sensor arrangements with another geometric arrangement of the sensor elements sensitive to different spectral regions. Also, the individual sensor elements do not have to be square-shaped, they may be parallelepiped-shaped or hexagonal, for example, wherein, in the latter case, it is possible to arrange the sensor elements in a geometrically different way. A favorable arrangement is arranging them not in the form of a matrix, but rather so that each one of the sides of the hexagonal sensor elements borders on another adjacent sensor element, so that the entire available area of the sensor element arrangement is covered with sensor elements without any gaps.

In the left-hand half of the depiction, FIG. 1a shows a gray scale image 10 of a sensor element arrangement 12, illustrated in detail in the right-hand half of the depiction, wherein the red, blue and green-sensitive pixels are arranged in the Bayer pattern. In the depictions, the contour of an optical fiber 14 (f) used for illumination of the sensor element arrangement is illustrated schematically. Furthermore, so as to clearly show the effect and/or the cause of the color corruption in the case of illumination by means of an optical fiber, an alternative optical fiber contour 16 is shown. The gray scale capture 10 illustrated in the left-hand half of the depiction is based on the illumination performed by means of optical fiber 14 and white light. In the case of homogeneous illumination with white light, all sensor elements of the different spectral regions would indicate approximately identical intensity values. At the center of the contour of the optical fiber 14, this property can be seen in the gray scale image 10, since an intensity profile without any strong gradients is generated in the central area of the optical fiber 14. Hence, the individual pixels and/or the intensity values associated with the individual sensor elements are approximately equally high (bright) in the central area of the optical fiber 14. Toward the edge of the optical fiber, the intensities become lower, as can be seen from the gray scale image 10. This is due to the light-guiding properties of the optical fiber.

The following short paragraph is to explain, once again, how the color shift develops in the illumination of a conventional color sensor element by means of an optical fiber. As can be seen on the basis of the depiction 12, the individual spectral regions (colors) are not detected at the same location, but at adjacent locations by the sensor element arrangement. Nevertheless, the color value, which consists of a triplet of three intensities (for red, for green, and for blue) in the case of the RGB color space, has to be associated with a point. To this end, the individual detected intensities are to be interpolated, so as to be able to indicate a color value for a space coordinate. Normally, this interpolation is performed by the camera itself, assuming that the entire sensor area is illuminated uniformly by the optics used. On the basis of this assumption, it is possible to compute an uncorrupted color value, taking into account the pixel areas sensitive to the respective spectral region and the intensity detected within these areas. This camera-implemented method fails in the case of illumination by means of optical fibers, since the condition of homogeneous illumination is not met here, as can be seen in the gray scale image 10, for example. On the one hand, it is to be taken into consideration that the central area is illuminated at higher intensity than the edge area. In the example shown in FIG. 1a,b, for example, the central green-sensitive pixel 20 is illuminated at high intensity, the blue-sensitive pixels adjacent thereto at lower intensity. Since these (just like the adjacent red-sensitive pixels) are utilized for color interpolation by the camera, this leads to the color value associated with the geometrical location of the central green-sensitive pixel by the camera being corrupted (having too strong a green component).

In addition, the ratio of the areas of the illuminated pixels of different spectral sensitivity varies from optical fiber to optical fiber. This also varies when employing different optical fibers and/or upon variation of the geometrical distance of the fiber bundle to the sensor element arrangement. For example, while the ratio of the green sensor elements illuminated by the optical fiber in an approximately complete manner to the ratio of the red sensor elements approximately completely illuminated is about 8/4 in the optical fiber contour 14, this area ratio would increase to 4/1 in the contour 16 depicted exemplarily, which would inevitably entail a green shift.

So as to compensate for the effect of this chrominance shift, a multi-stage method for correction of the color shift in fiber-optic systems, as well as a device corresponding thereto, will be described in the following paragraphs.

In the following, as illustrated in FIG. 1a,b, only those sensor elements illuminated by the optical fiber associated therewith are to be considered. In the gray scale image of FIG. 1b, for example, these are the sensor elements bordered by the contour 22 (SE). This choice is to be construed as merely exemplary. With respect to the edge pixels, there is some freedom here, and these could also be included in the following considerations, i.e. all pixels could be considered, even though they only comprise an extremely small geometrical overlap with the contour of the optical fiber. For the application of the algorithm described in the following, the exact contour is not substantial, but it may not change anymore following calibration.

At first, one may find and determine the sensor elements illuminated by an optical fiber, i.e. the contour 22 (SE). This is possible at an accuracy exceeding the geometrical expanse of the individual sensor elements. For example, the center of the light distribution associated with a fiber can be determined by weighted summation of the intensities of the individual sensor elements, or a two-dimensional intensity distribution function can be fitted to the intensity distribution observed by a sensor, from the parameters of which the center of the light distribution can be determined.

A first step of the initialization thus includes the sub-pixel-accurate fiber registration. Ensuing color calibration for computing correction factors and/or calibration values will be explained in even more detail further below. For the initialization and/or the calibration, by way of example and without limitation of the general meaning, a white image, which is to carry the index k in the following, is recorded. The intensity values and/or the fiber regions in this image must not show saturation here, i.e. the maximum value of the intensity in the image must not exceed the maximum value of the sensor resolution and/or the maximum numerical value dependent on the digitization depth.

Prior to the following considerations, it is to be mentioned that the initialization theoretically only has to be performed once. However, repositioning and/or dispositioning between fiber cross-section (fiberscope) and sensor may necessitate repeated initialization in practice. In order to preclude such a potential corruption, the initialization may also be repeated periodically for recalibration.

With respect to the fiber registration, i.e. the determination of the fiber centers on the sensor surface and the sensor elements illuminated by means of a fiber, it is to be noted that commercially available cameras and/or sensor element arrangements usually work with eight-bit quantization. More recent cameras, however, increasingly offer the possibility of sensing image data at higher quantization, such as at 12, 14 or 16 bits. When using greater quantization depth, the location of the center of an optical fiber can be determined with higher precision, so that the localization of the fiber centers may take place on the basis of the high-resolution gray scale values in some embodiments of the present invention, whereupon the downstream color calibration is performed on the basis of a lower-resolution representation of the captured image.

When illuminated with white light, assuming uniform color composition of the white light and identical maximum sensitivity of the sensor elements associated with the respective spectral regions, the determination of the fiber centers may, for example, take place by fitting a single intensity distribution to the recorded intensity pattern, since each sensor element reacts with its identical sensitivity to the white light, independently of its color, based on the assumptions stated above. Alternatively, of course, also colored light can be used for determining the fiber centers, only necessitating knowledge of the spectral sensitivity of the individual sensor elements so as to take the illumination by colored light into account by way of correction factors derived from the spectral sensitivities of the individual sensor elements.

For completeness sake only, it is to be mentioned that, following the determination of the fiber centers and the color correction described below, interpolation of several successive captures (with motion compensation methods, for example) can be performed in order to obtain an artifact-free image with color fidelity of the fiber-optically acquired scene.

The correction of the color error now described will be explained in the following for the three-channel RGB color space without limitation of general meaning. In the following considerations, reference will be made to the features shown in FIG. 1$a,b$, and particularly to the area 14 of sensor elements SE covered by the optical fiber and designated by f in the gray scale image 10. For the individual color channels, which are designated by R, G and B in the following, the schematic illustration of a CCD camera sensor with the RGB Bayer pattern depicted in the right-hand part of the image is relevant.

For such a sensor, the intensity image can be generated at high quantization, i.e. high resolution, and the color correction described in the following can be performed based on the finely quantized data. For potential postprocessing by means of motion compensation, it is to be pointed out that this may not only be performed on the basis of the determined coordinates of the fiber centers, but also the pixels of the locally more highly resolved green channel, for example.

As already mentioned, the information on the position of the fiber centers and the nature of the fiber shape is to be assumed as known in the following.

Figure 2:
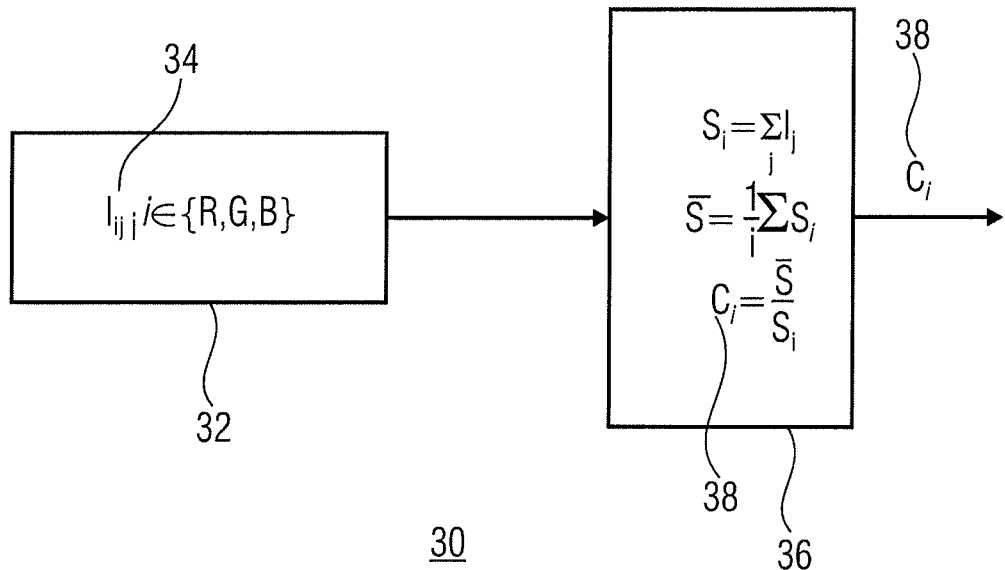
FIG. 2 shows an embodiment of a calibration device.

FIG. 2 exemplarily shows a schematic illustration of an example of a calibration device for determining a calibration value that is associated with an optical fiber of a fiberscope for each spectral region of a number of sensor spectral regions of the sensor element arrangement, which consists of the sensor elements sensitive to one spectral region each.

The calibration device 10 comprises detecting means 32 to detect intensity values 34 ($I_{ij}$) for all sensor elements illuminated with light of known spectral composition by the optical fiber. Here and in the following, the index i is to denote the sensor spectral region considered, and the index j a specific pixel of the sensor spectral region considered that is illuminated by the respective optical fiber.

The calibration device 34 further comprises evaluating means 36 to determine calibration values 38 $C_i$ associated with the respective spectral regions, so that a color value, which may be formed from the intensity values of the sensor elements that are weighted with the respective calibration values, describes the spectral composition of the light. The color calibration thus serves for computing the correction factors and/or the calibration values $C_i$ 38.

What is assumed is the information of the fiber registration, on the basis of which now all sensor elements SE can be associated with their closest fiber f, as can be taken from FIG. 1$a,b$, for example. For a white image having the index k, i.e. an illumination with white light, these are the elements $$SE^{k,f} \text{ with } f \in F$$

for the fiber f from the set of all fibers F.

The evaluating means 36 is to generate calibration values such that a calibrated color value describes the spectral composition of the light. For example, this may be achieved by considering a weighted sum of the intensity values of the sensor elements corresponding to the respective calibration values.

Thus, the intensities of the associated sensor elements SE can be summed to give a sum S per color channel:

$$S_i^{k,f} = \Sigma I_i^{k,f} \text{ with } i \in \{R, G, B\} \text{ and } f \in F.$$

Therefrom, a mean intensity $\overline{S}$, i.e. the target intensity with which each color, i.e. each spectral region, is to contribute to the color value after the calibration can be calculated according to the following formula:

$$\overline{S}^{k,f} = \frac{1}{3} \sum S_i^{k,f} \text{ with } i \in \{R, G, B\} \text{ and } f \in F.$$

From the actual intensity of the sensor elements S of the mean intensity thus calculated, a correction factor $C_i$ and/or a calibration value $C_i$ for each spectral region of the set of sensor spectral regions, i.e. for R, G and B, can be calculated according to the following equation $$C_i^f = \frac{\overline{S}^{k,f}}{S_i^{k,f}} \text{ with } e \in \{R, G, B\} \text{ and } f \in F.$$

In the image processing, the multiplication of the captured intensity values by this correction factor leads to the color shifts based on the above-described defects to be cancelled, so that an image with color fidelity can be obtained.

Figure 3:
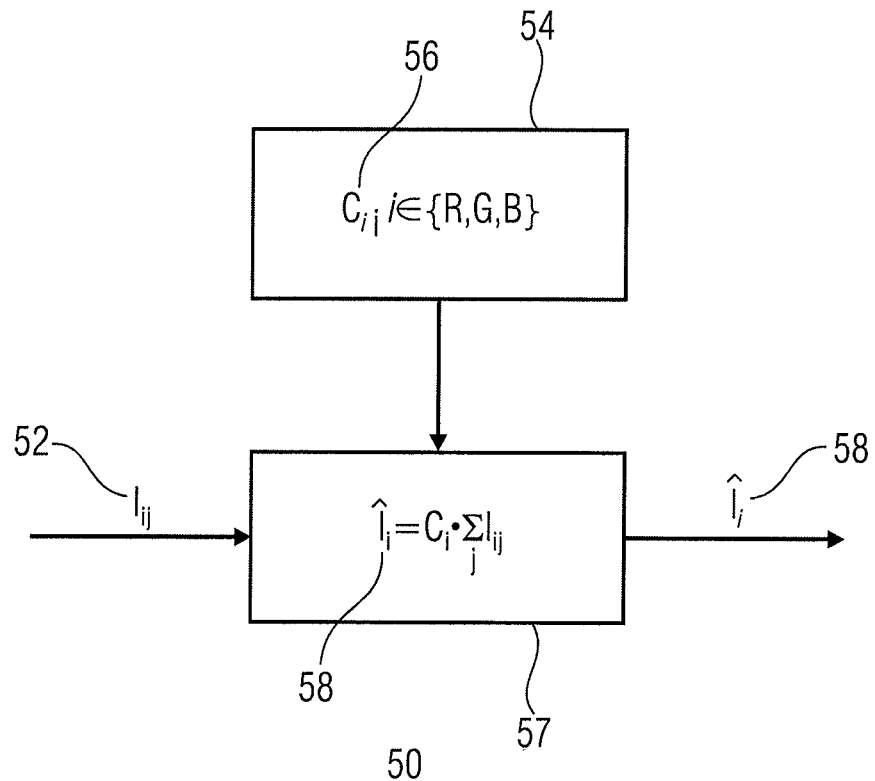
FIG. 3 shows an embodiment of a device for generating a color value associated with an optical fiber.

FIG. 3 shows an example of a device 50 for generating a color value associated with an optical fiber of a fiberscope, based on intensity values 52 ($I_{ij}$) of a plurality of sensor elements of a sensor element arrangement that are sensitive to one spectral region each from a set of sensor spectral regions. The device 50 comprises providing means 54 to make the calibration values 55 generated with the calibration device 30, for example, available to each of the spectral regions (R, G, B). The device 50 further comprises correcting means 57 to combine the intensity values 52 of all sensor elements of the respective spectral region that are illuminated by the light guide and the calibration value 56 associated with the respective spectral region, in order to obtain a color value 58 associated with the optical fiber.

The steps for generating a color value, which will be described in greater detail in the following, may be performed for single images or for entire sequences of images. Such a sequence here may originate from a live stream, i.e. image sequences captured topically, from archived images, from an image stack, or the like. Without limitation of the general meaning, however, the method will only be explained on the basis of a single image, which is to carry the index k.

The correcting means 57 is formed to sum, for the associated $SE_i^{k,f}$ of a fiber f the current image per channel i, their intensity I to the sum S:

$$S_i^{k,f} = \Sigma I_i^{k,f} \text{ with } i \in \{R, G, B\} \text{ and } f \in F.$$

Furthermore, the corrected intensity $\hat{I}$ for the channel i of a fiber f is computed by the correcting means 57 from the current image k of the product of the sum $S_i^{k,f}$ and the correction factor $C_i^f$ as follows:

$$\hat{I}_i^{k,f} = S_i^{k,f} \cdot C_i^f \text{ with } i \in \{R,G,B\} \text{ and } f \in F.$$

Following the correction and/or the combination of the intensity values with the calibration value, now a color value $V_{color}$, which is formed by the triplet of the corrected intensity values 58, for example, may be assigned to the fiber f:

$$V_{C_{color}}{}^{k,f} = (I_R, I_G, I_B)^{k,f} \text{ for } f \in F.$$

As already mentioned, the use of the RGB color space and the sensor element arrangements described in the previous figures is merely exemplarily. The application of the inventive concept to another color space thus would also lead to a corrected color value that only describes another parameterization.

Figure 4:
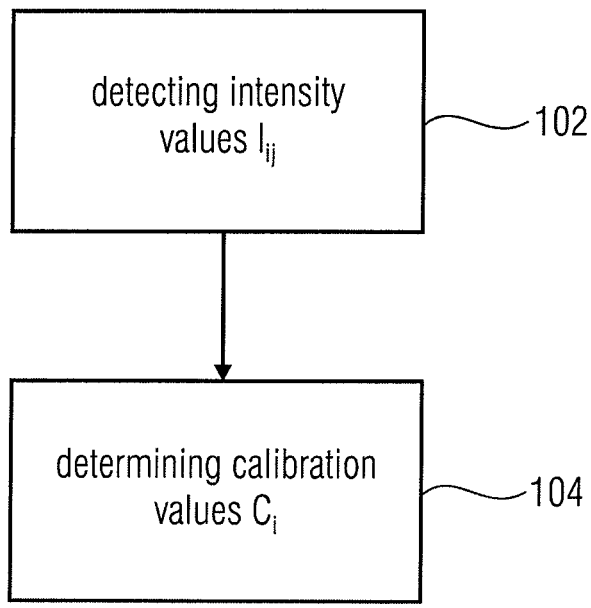
FIG. 4 shows an example of a method of determining calibration values.

FIG. 4 shows an example of a method of determining a calibration value associated with an optical fiber of a fiberscope for each spectral region of a set of sensor spectral regions of a sensor element arrangement of sensor elements sensitive to one spectral region each.

In a detection step 102, intensity values for all sensor elements illuminated with light of known spectral composition by the optical fiber are detected.

In a calibration step 104, calibration values associated with the respective spectral regions are determined, so that a color value, which can be formed from the intensity values of the sensor elements combined with the respective calibration values, describes the spectral composition of the light.

Figure 5:
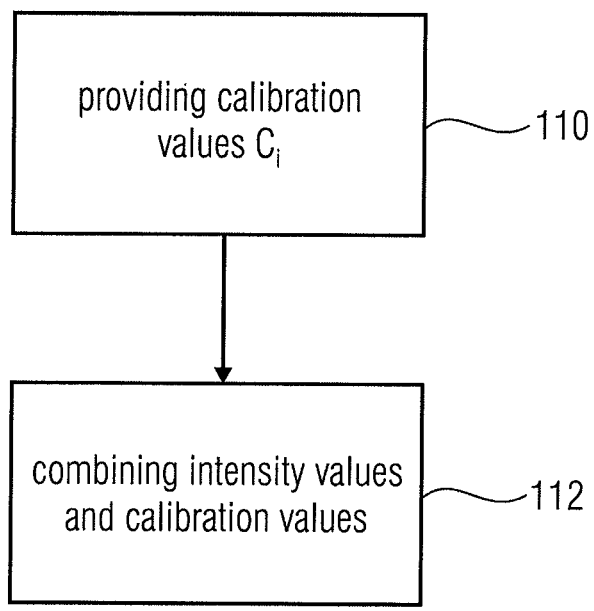
FIG. 5 shows an example of a method of generating a color value associated with an optical fiber.

FIG. 5 shows an example of a method of generating a color value associated with an optical fiber of a fiberscope, based on intensity values of a plurality of sensor elements of a sensor element arrangement that are sensitive to one spectral region each from a set of sensor spectral regions.

In a providing step 110, calibration values associated with an optical fiber are provided for each of the sensor spectral regions.

In a correction step 112, the intensity values of all sensor elements of the respective spectral region that are illuminated by the light guide and the calibration values associated with the respective spectral region are combined to obtain the color value associated with the optical fiber.

As already mentioned, following the color correction, interpolation of the color captures can be performed in the further processing of the fiberscopic captures, in order to obtain a pattern-free image. Alternatively, also motion compensation of a moving image sequence can be used to remove the structures caused by the geometrical arrangement of the optical fibers in the fiber bundle. Here, each of the algorithms used for this purpose may utilize the color value and/or the corrected color value $V_{color}$ for each fiber, instead of an individual gray scale amplitude. If the previous steps are performed with high accuracy (at quantizations of 10, 12 or 16 bits, for example), discretization to a low quantization may take place at the end of the interpolation algorithms, so that all previous steps are performed with greater accuracy, and a lossy requantization step does not take place until the end of the processing chain. Such requantization may, for example, be needed so as to represent the results of the above-described image enhancement measures on an eight-bit monitor. Such discretization may, however, also be omitted completely if high-resolution reproduction media are available, or may take place at another point.

In addition to a spectral correction factor, the intensity distribution known from the registration (a Gaussian distribution, for example) may be used for additionally weighting the correction factors. When summing the intensities, each sensor element is then included, as weighted area integral, into the sum to be calculated and weighted with the (spectral) correction factor.

As already described, correction factors for spectral correction may also be acquired with other algorithms, for example, with a histogram-based approach. The computation of the correction of the color shift may also be supported by specially programmable graphics hardware, i.e. the GPU of a graphics card, and/or may also be performed completely by the graphics hardware, in order to allow for real-time processing. Furthermore, the inventive concept may, for example, be integrated in an intelligent camera, i.e. a camera also including internal computation capacity. Alternatively, the method may also be realized on an FPGA, and/or programmed therefor, in order to increase the processing speed and allow for real-time processing.

Depending on the circumstances, the inventive method of generating a color value associated with an optical fiber of a fiberscope or the method of determining a calibration value associated with an optical fiber of a fiberscope may be implemented in hardware or in software. The implementation may take place on a digital storage medium, particularly a disk or CD with electronically readable control signals configured to co-operate with a programmable computer system so that the inventive methods are executed. In general, the invention thus also consists in a computer program product with a program code stored on a machine-readable carrier for performing the inventive method, when the computer program product is executed on a computer. In other words, the invention may thus be realized as a computer program with a program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, comprising:
   a memory for providing, for each of the sensor spectral regions, a calibration value associated with the optical fiber; and
   a corrector for combining the intensity values of all sensor elements illuminated by the optical fiber wherein the corrector is formed to, for each sensor spectral region, sum the intensity values of the sensor elements sensitive to the respective sensor spectral region, and weight the sum with the calibration value associated with the respective sensor spectral region, in order to acquire the color value associated with the optical fiber,
   wherein at least one of the memory and the corrector comprises a hardware implementation.

2. The device according to claim 1, wherein the corrector is formed to combine the intensity value $I_i$ of the sensor elements i of the respective sensor spectral region and the calibration value C associated with the respective sensor spectral region to a combination value I so that the combination can be described by the following equation:

$$I = C \times \sum_i I_i.$$

3. The device according to claim 1, wherein the memory is additionally formed to provide, for each sensor element, a profile weighting factor, which describes a two-dimensional intensity distribution of all sensor elements illuminated by the optical fiber.

4. The device according to claim 1, wherein the corrector is formed to provide, as the color value associated with the optical fiber, a value tuple of corrected intensity values of all sensor spectral regions.

5. The device according to claim 1, wherein the memory is formed to provide a calibration value each for a red, a green and a blue sensor spectral region.

6. The device according to claim 1, which is formed to generate an associated color value for each optical fiber of the fiberscope.

7. A calibration device for determining a calibration value associated with an optical fiber of a fiberscope for each sensor spectral region of a set of sensor spectral regions of a sensor element arrangement of sensor elements sensitive to one sensor spectral region each for an optical fiber mapped to several sensor elements of the sensor element arrangement, comprising:
    a detector formed to detect intensity values for all sensor elements illuminated with light of known spectral composition by the optical fiber; and
    an evaluator formed to determine, for each sensor spectral region, the calibration value associated with the respective sensor spectral region by summing the intensity values of the sensor elements sensitive to the respective sensor spectral region to obtain a sum for the respective sensor spectral region and determining the calibration value associated with the respective sensor spectral region such that the sums of the intensity values of the sensor elements, sensitive to the sensor spectral regions, weighted with the calibration value for the respective sensor spectral region, equal an actual decomposition of the light into the set of sensor spectral regions.

8. The calibration device according to claim 7, wherein the detector is formed to detect intensity values for all sensor elements illuminated with white light by the optical fiber.

9. The calibration device according to claim 7, wherein the evaluator is formed to determine a calibration value each for a red, a green and a blue sensor spectral region.

10. The calibration device according to claim 7, wherein the evaluator is formed to determine the calibration values so that a sum of the intensity values of the sensor elements corresponding to the respective sensor spectral regions, which is weighted with the respective calibration values, is identical for all sensor spectral regions.

11. The calibration device according to claim 10, wherein the evaluator is formed to determine the calibration values so that for each sensor spectral region, the sum of the intensity values of the sensor elements corresponding to the respective sensor spectral region, is weighted with the respective calibration value, and equals a fraction of a sum of all sums of the intensity values of all sensor spectral regions, with the fraction equaling a value of 1 divided by the number of sensor spectral regions.

12. The calibration device according to claim 7, wherein the evaluator is formed to determine the calibration values $C_i$ for the sensor spectral region i from the sum $S_i$ of the detected intensity values $I_{ij}$ of sensor elements j(i) associated with sensor spectral region i $$S_i = \sum_j I_{ij}$$

and a detected mean intensity $\overline{S}$ $$\overline{S} = \frac{1}{i} \times \sum_i S_i$$

such that the determination can be described by the following equation:

$$C_i = \frac{\overline{S}}{S_i}.$$

13. The calibration device according to claim 7, which is formed to determine calibration values for each one of the optical fibers of the fiberscope.

14. A method of generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, comprising:
    providing, performed by a memory, for each of the sensor spectral regions, a calibration value associated with the optical fiber; and
    for each sensor spectral region, performed by a corrector, summing the intensity values of the sensor elements sensitive to the respective sensor spectral region, and weighting the sum with the calibration values associated with the respective sensor spectral regions, in order to acquire the color value associated with the optical fiber,
    wherein at least one of the memory and the corrector comprises a hardware implementation.

15. A method of determining a calibration value associated with an optical fiber of a fiberscope for each sensor spectral region of a set of sensor spectral regions of a sensor element arrangement of sensor elements sensitive to one sensor spectral region each for an optical fiber mapped to several sensor elements of the sensor element arrangement, comprising:
    detecting, performed by a detector, intensity values for all sensor elements illuminated with light of known spectral composition by the optical fiber; and
    determining, performed by an evaluator, the calibration values associated with the respective sensor spectral regions by summing the intensity values of the sensor elements sensitive to the respective sensor spectral region to obtain a sum for the respective sensor spectral region and determining the calibration value associated with the respective sensor spectral region such that the sums of the intensity values of the sensor elements, sensitive to the sensor spectral regions, weighted with the calibration value for the respective sensor spectral region, equal an actual decomposition of the light into the set of sensor spectral regions, wherein at least one of the detector and the evaluator comprises a hardware implementation.

16. A non-transitory computer-readable storage medium having stored thereon a computer program with a program code for performing, when the program is executed on a computer, a method of generating a color value associated with an optical fiber of a fiberscope mapped to several sensor elements of a sensor element arrangement, based on intensity values of a plurality of sensor elements of the sensor element arrangement that are sensitive to one spectral region each from a set of sensor spectral regions, the method comprising:
   providing a calibration value associated with the optical fiber for each of the sensor spectral regions; and
   for each sensor spectral region, summing the intensity values of the sensor elements sensitive to the respective sensor spectral region, and weighting the sum with the calibration values associated with the respective sensor spectral regions, in order to acquire the color value associated with the optical fiber.

17. A non-transitory computer-readable storage medium having stored thereon a computer program with a program code for performing, when the program is executed on a computer, a method of determining a calibration value associated with an optical fiber of a fiberscope for each spectral region of a set of sensor spectral regions of a sensor element arrangement of sensor elements sensitive to one sensor spectral region each for an optical fiber mapped to several sensor elements of the sensor element arrangement, the method comprising:
   detecting intensity values for all sensor elements illuminated with light of known spectral composition by the optical fiber; and
   determining the calibration values associated with the respective sensor spectral regions by summing the intensity values of the sensor elements sensitive to the respective sensor spectral region to obtain a sum for the respective sensor spectral region and determining the calibration value associated with the respective sensor spectral region such that the sums of the intensity values of the sensor elements, sensitive to the sensor spectral regions, weighted with the calibration value for the respective sensor spectral region, equal an actual decomposition of the light into the set of sensor spectral regions.

* * * * *

UNITED STATES PATENT AND TRADEMARK OFFICE
CERTIFICATE OF CORRECTION

PATENT NO.           : 8,589,104 B2                                                     Page 1 of 1
APPLICATION NO. : 12/663494
DATED                    : November 19, 2013
INVENTOR(S)         : Winer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Twenty-second Day of September, 2015

Michelle K. Lee
*Director of the United States Patent and Trademark Office*